United States Patent [19]
Janning

[11] Patent Number: 6,052,448
[45] Date of Patent: *Apr. 18, 2000

[54] METHOD FOR FLEXIBLE FORMATTING OF CALL DETAIL RECORDS AND SWITCHING SYSTEM INCORPORATING SAME

[75] Inventor: William J. Janning, Allen, Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/996,886

[22] Filed: Dec. 23, 1997

[51] Int. Cl.⁷ .................................................. H04M 15/00
[52] U.S. Cl. .......................... 379/114; 379/126; 379/133
[58] Field of Search .................................. 379/111, 112, 379/114, 115, 116, 119, 121, 144, 120, 126, 127, 133, 134, 113

[56] References Cited

U.S. PATENT DOCUMENTS

| | | | |
|---|---|---|---|
| 5,218,632 | 6/1993 | Cool | 379/114 |
| 5,511,113 | 4/1996 | Tasaki et al. | 379/112 |
| 5,907,603 | 5/1999 | Gallagher et al. | 379/133 |

FOREIGN PATENT DOCUMENTS

WO91/03023  3/1991  United Kingdom ............ G06F 15/30

*Primary Examiner*—Paul Loomis
*Assistant Examiner*—Binh K. Tieu
*Attorney, Agent, or Firm*—Haynes and Boone, L.L.P.

[57] ABSTRACT

A method for formatting CDRs to reduce storage and processing requirements within a switch or telecommunications network which formats CDRs in accordance with the disclosed techniques. A switch includes a call condense agent for collecting raw call information for calls handled thereby and a formatting agent for selecting, based upon an examination of said raw call information, an optimal data structure for formatting the raw call information and for producing a CDR by formatting said raw call information in accordance with said optimal data structure. The optimal data structure is that which best fits the raw call information. The best fitting data structure is chosen by determining, for each template, which call detail types are classified as "must-have" or "don't care" and selecting the template which includes all of the must-have call details and the greatest number of "don't care" call details captured by the raw call information and the least amount of store for call detail types which were not captured by the raw call information. The switch also includes a storage facility, coupled to the call condense and formatting agents, for maintaining the raw call information, a plurality of data structures and the CDRs therein. If the method is performed within a telecommunications network, the formatter and storage facility will reside within a billing server coupled to the switch.

15 Claims, 3 Drawing Sheets

METHOD FOR FLEXIBLE FORMATTING OF CALL DETAIL RECORDS AND SWITCHING SYSTEM INCORPORATING SAME

TECHNICAL FIELD

The invention relates generally to switching devices for a telecommunications network and, more particularly, to a system and method for flexible formatting of call detail records generated by the switching device for calls handled thereby.

BACKGROUND OF THE INVENTION

Within a telecommunications network, a switching device couples originating and terminating stations for a call. While the call is in progress, the switching device captures various types of information regarding the call. The captured information is then written to a file which contains information related to a number of calls handled by the switching device. Later, the file is transferred to a computer system for processing. There, the information contained in the file may be used for billing or other purposes.

The collected information includes such data as timestamps of the current time of day, subscriber number and address digits dialed by the subscriber, information on the originating and terminating agents used in the call and other call information. The collected data is stored in a per-call data structure commonly referred to as a recording unit (or "RU"). When the call has been disconnected, the collected information is delivered to a formatter. There, the raw information is arranged into a pre-determined data structure and stored for later use.

Oftentimes, the formatted records are stored in device independent recording package (or "DIRP") files. A DIRP file consists of a number of 2,048 byte blocks, each holding as many formatted records as possible. For the information contained in the DIRP file to be correctly processed, additional types of formatted records, known as "event records", are also stored in the DIRP file block. These event records may include block header, graceful start, graceful end, emergency start, system restart and clock change headers.

Existing techniques for storing formatted records are very inefficient. For example, all formatted call detail records (or "CDRs") contain the same fields. Since each call is different, however, various fields are left empty if the call processing event associated with that field never occurs. Furthermore, all records maintained in a DIRP file block (CDRs and event records) are fixed at the same length—typically between 60 and 80 words—the length of a formatted CDR record. As a result, therefore, other records maintained in the DIRP file block, must be null padded to that word length. This null padding is particularly wasteful when one considers that many event records, for example a graceful start record (or "GSR") may be stored using three words. Finally, when new services are offered to subscribers, the size of the CDR record must be increased to accommodate data collected regarding use of the newly added services. Such alterations to the format of the CDR record force service providers into modifying their CDR processing systems, even when new service fields are not needed by a particular service provider.

SUMMARY OF THE INVENTION

The present invention, accordingly, provides a method for formatting CDRs to reduce storage and processing requirements within a switch or telecommunications network which formats CDRs in accordance with the disclosed techniques.

A switch includes a call condense agent for collecting raw call information for calls handled thereby and a formatting agent for selecting, based upon an examination of the raw call information, an optimal data structure for formatting the raw call information and for producing a CDR by formatting the raw call information in accordance with the optimal data structure. The optimal data structure is that which best fits the raw call information. The "best fit" data structure is chosen by determining, for each template, which call detail types are classified as "must-have" or "don't care", respectively, and selecting the template which includes (1) all of the "must-have" call details which were captured by the raw call information, (2) the greatest number of "don't care" call details which were captured by the raw call information and (3) the least amount of store for call detail types which were not captured by the raw call information.

The switch may also include a storage facility, coupled to the call condense and formatting agents, for maintaining the raw call information, a plurality of data structures and the CDRs. Here, the formatter compares each one of the plurality of data structures to the raw call information and, based on the comparisons, selects one of the plurality of data structures as the optimal data structure. In the embodiment of the invention where the method is performed within a telecommunications network, the formatter and storage facility will reside within a billing server coupled to the switch.

The present invention further provides a method of selectively formatting call detail information which provides a wide degree of flexibility in selecting formats for CDRs to be generated from collected raw call information. A first CDR template and a table which includes a plurality of additional CDR templates are available for selection. The first CDR template defines a full-set data structure which includes all types of call details while each template of the table is comprised of a respective subset of the types of call details. If the first CDR template is selected, call detail information is formatted in accordance with the full-set data structure defined thereby. If, however, the CDR template table is selected, call detail information acquired during a call is examined and one of the CDR templates from the CDR template table is selected based upon the examination of the call detail information. The call detail information is then formatted in accordance with a subset data structure defined by the selected template.

Even greater flexibility in selecting formats for CDRs to be generated from collected raw call information is available in further embodiments of the invention. In these embodiments, if the first CDR template is not selected, the call detail information acquired during the call is examined to determine whether the first CDR template or one of the CDR templates from the CDR template table is to be selected. If one of the CDR templates has been pre-selected, the call detail information is formatted in accordance with the pre-selected CDR template. If not, a CDR template is selected from the table based upon an examination of the call detail information. The call detail information is then formatted in accordance with a subset data structure defined by the CDR template.

DESCRIPTION OF A PREFERRED EMBODIMENT

Figure 1A:
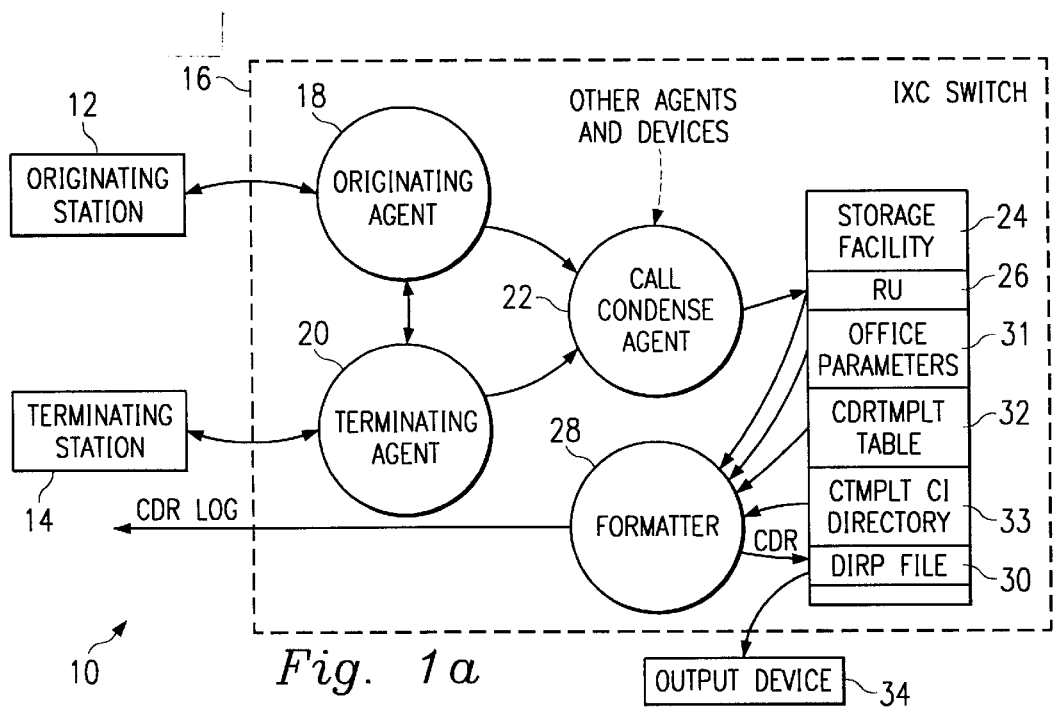
FIG. 1a is a block diagram of a telecommunications network which includes a switching device equipped for flexible formatting of CDR records in accordance with the teachings of the present invention.

Referring first to FIG. 1a the reference numeral 10 designates a telecommunications network. While, in the disclosed embodiment of the invention, a public switched telephone network (or "PSTN") is selected as the telecommunications network 10, it should be clearly understood that the invention is equally suitable for use with other types of telecommunication networks. The telecommunications network 10 includes an interexchange carrier (or "IXC") switch 16, for example, a UCS DMS-250 switch manufactured by Nortel, which directs a call initiated by an originating station 12 to a terminating station 14. In one embodiment thereof, the first and second stations 12 and 14 may be the originating and terminating phone terminals for the call. In another embodiment, the first and second stations 12 and 14 may be trunks which couple the switch 16 to other switches, for example, local exchange carrier (or "LEC") switches (not shown) of the PSTN or other telecommunications network 10. It should be clearly understood that the PSTN or other telecommunications network 10 will typically include includes a wide array of other, conventional, devices which have been omitted from FIG. 1a for ease of illustration. Furthermore, while, as disclosed herein, the present invention resides within the IXC switch 16, it should be clearly understood that the invention is equally suitable for use in other environments.

The IXC switch 16 is comprised of various hardware and software components which enable it to complete a requested connection between the originating and terminating stations 12 and 14. Two such components are an originating agent 18, which handles exchanges with the originating station 12, and a terminating agent 20, which handles exchanges with the terminating station 14. Others have been omitted from the drawing, again for ease of illustration. While a call is ongoing, various types of information regarding the call are collected by call condense agent 22 from various locations within the IXC switch 16 which include, but are not limited to, the originating and terminating agents 18 and 20. The information collected by the call condense agent 22 includes time of call, subscriber number for the originator of the call, address digits dialed by the subscriber, information on the originating and terminating agents used to complete the call and other types of call information. It is contemplated that the call condense agent 22 may collect information on the call in a variety of ways. The originating and terminating agents 18 and 20, or other hardware or software components containing call information, may periodically transmit the call information to the call condense agent 22. Alternately, the call condense agent 22 may periodically poll the originating and terminating agents 18 and 20 (or other components) containing the call information.

The call condense agent 22 stores the collected information regarding the call in a portion 26, generally referred to as a recording unit (or "RU"), of a storage facility 24 located within the IXC switch 16. The RU 26 holds unformatted raw information collected by the call condense agent 22 from the aforementioned various locations within the switch 16. In addition to the unformatted raw information, the RU 26 also holds a capture map which will be more fully described below. When the call is disconnected, the unformatted raw information and the capture map contained in the RU 26 are transmitted to a formatter 28 where the unformatted raw information is formatted into a defined data structure. As will be more fully described below, the formatter 28 formats the raw information into a selected data structure commonly referred to as a call detail record (or "CDR") which is then stored in a DIRP file 30. In turn, the contents of the DIRP file 30 are propagated to an output device 34, for example, a storage device, coupled to the IXC switch 16, for use in constructing billing records. While only a single DIRP file 30 and output device 34 are illustrated herein, it is fully contemplated that the CDRs output the formatter 28 and/or the contents of the DIRP file 30 may be propagated to plural destinations. Additionally, the formatter 28 generates a CDR log containing various information regarding the formatting of CDRs thereby.

As the CDRs produced by the formatter 28 are variously sized depending on the particular template used to format the raw information into the CDR, the DIRP file 30 will contain CDRs of various sizes. Since CDRs have traditionally incorporated unused or empty fields for types of information not collected for a particular call, it is contemplated that, by use of variously sized CDRs formatted in accordance with a selected template, the frequency of unused fields in CDRs will be reduced, thereby enabling more CDRs to be fitted within a DIRP which, in turn, will increase call handling capacity for the IXC switch 16.

Figure 1B:
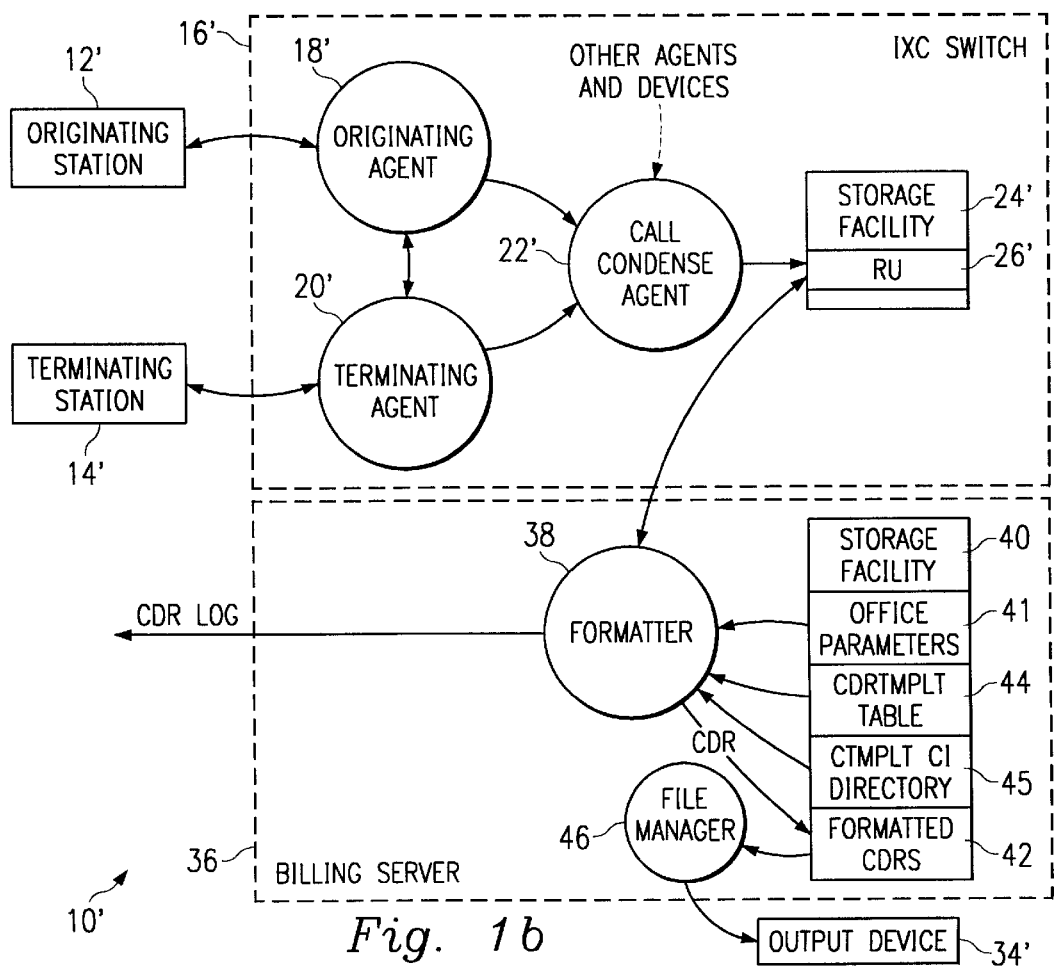
FIG. 1b is a block diagram of an alternate embodiment of a telecommunications network equipped for flexible formatting of CDR records in accordance with the teachings of the present invention.

Further, as disclosed herein, the formatter 28, as well as the storage facility 24 which maintains the DIRP file 30, resides within the IXC switch 16. It is fully contemplated, however, that, in an alternate embodiment of the invention, the formatter 28, as well as the storage facility 24 that maintains the formatted CDRs generated by the formatter 28, may reside in a separate device. Such an alternate configuration is illustrated in FIG. 1b, As may now be seen, a telecommunications network 10', for example, a PSTN, includes an originating station 12', a terminating station 14', an IXC switch 16' and a billing server 36. The IXC switch 16' directs calls initiated by the originating station 12' to the terminating station 14'. The IXC switch 16' is comprised of various hardware and software components which enable it to complete a requested connection between the originating and terminating stations 12' and 14'. Two such components are an originating agent 18' and a terminating agent 20'. While a call is ongoing, various types of information regarding the call are collected by call condense agent 22' from various locations within the IXC switch 16' which include, but are not limited to, the originating and terminating agents 18' and 20'.

The call condense agent 22' stores the collected information regarding the call in an RU portion 26' of a storage facility 24' located within the IXC switch 16'. When the call is disconnected, the raw information contained in the RU 26' is transmitted to a formatter 38 residing within the billing server 36. The formatter 38 formats the RU 26 into a CDR and stores the CDR in a formatted CDRs portion 42 of a storage facility 40 located within the billing server 36. As before, depending on the particular data structure or structures used by the formatter 38 during the formatting process, the CDRs generated thereby will be various sizes. The billing server 36 also includes a file manager 46 which controls the propagation of formatted CDRs maintained in the formatted CDR portion 42 of the storage facility 40 to an output device 34' for use in constructing billing records.

Prior to describing the method of formatting raw call information stored in the RU 26 or 26', office parameters 31, CDR template (or "CDRTMPLT") table 32 and CTMPLT C1 directory 33 (when formatting is performed within the IXC 16) or office parameters 41, CDRTMPLT table 44 and CTMPLT C1 directory 45 (when formatting is performed within the billing server 36) will be described in greater detail. The office parameters 31 control the length and output of event records and are arranged into plural groups, a first one of which is event record size office parameters and a second one of which is CDR formatting office parameters. The event record size office parameters identify the sizes of individual records stored in the DIRP file 30. The CDR formatting office parameters identify how CDR records and fields within the CDR record are formatted and include the FCDR_CDR_TMPLT office parameter which identifies the template algorithm used in formatting CDR records. If FCDR_CDR_TMPLT is set to FIXED, then the TMPLT field is data-filled with the template to be used. If FCDR_CDR_TMPLT is set to VARIABLE, then an optimal template for formatting the RU 26 or 26' is chosen from the tables identified in the CDRTMPLT table in accordance with the method described below with respect to FIG. 3. Finally, if set to INTERNAL, then existing software is used to format the RU 26 or 26' in accordance with the superset CDR format previously described herein. The office parameter FCDR_CDR_WORD_LAYOUT identifies the method for storing the data for each formatted word of the CDR record. A value of NORMAL identifies that the field is stored in normal computer format. A value of READLR identifies that the field is recorded in such a way that the stored digits read left to right on a word by word basis, instead of right to left. For CDR field types which do not consume whole words of store, a value of READLR indicates that the most significant bits in the word are consumed first by a formatted CDR field while a value of NORMAL indicates that the least significant bits in the word are consumed first.

The CDRTMPLT table 32 or 44 defines data structures, also referred to as "templates" for formatting RUs 26 or 26' into a CDR. The CDRTMPLT table 32 or 44 is comprised of a series of template entries, each of which includes first, second and third fields. For each template entry, the first field indicates whether the template is active, i.e., can be used for formatting the RUs 26 or 26', or inactive, i.e., cannot be used for formatting. The second field of the template entry indicates whether the template is designated as a primary template or a secondary template. The third field of the template entry identifies, through a vector of field names, all of the CDR field types which define the template. A field size and a CDR field type attribute, on the other hand, are maintained systemwide. Specifically, the field size (in bits) is maintained by the software as part of the definition of the field and a CDR field type attribute is maintained through the CTMPLT command. The CDR field type attribute is either set to "Don't Care" or "Must Have". RUs formatted using the template consist of the fields defined in this vector. Preferably, the CDRTMPLT table 32 or 44 may contain up to 63 template entries, each of which contains a user-defined template while the third field of each template entry may contain up to 128 CDR fields which are to be included in that template. Table I, below, lists the CDR fields which may be included as part of one or more of the entries of the CDRTMPLT table 32 or 44.

TABLE I

| Field Name | Field Size (in bits) | Description |
| --- | --- | --- |
| ACCTCD | 48 | Contains a maximum of 12 TBCD account code digits collected for the call. |
| ACCTV | 2 | Identifies screening information for account code digit collection.<br>• 0: No account code collected, or digits collected.<br>• 1: Account code collected, but not validated.<br>• 2: Account code collected and validation attempted.<br>• 3: Account code validation passed with empty index screening. |
| ACG | 1 | Identifies if automatic call gapping occurred on the call.<br>• 0: Control number not present in control list.<br>• 1: Control number is present in control list. |
| ADDRNUM | 2 | Indicates which overflow translated number was used for the call.<br>• 0: Not Used<br>• 1: Address #1(default)<br>• 2: Address #2<br>• 3: Address #3 |
| ADIN | 8 | Contains two TBCD digits which identifies the index number of the authcode database used for authcode screening. |
| ANISP | 40 | Contains a maximum of 10 TBCD ANI digits collected for the call. |
| ANISUFF | 3 | Identifies the nature of the EA call.<br>• 0: No ST digit<br>• 1: ST3P (transitional)<br>• 2: STP (cut-thru)<br>• 3: ST2P (transitional)<br>• 4: ST (pure)<br>• 5: Invalid ST digit |
| ANSCDR | 1 | Indicates whether or not a CDR was generated at the answer event for the call.<br>• 0: Answer CDR not generated.<br>• 1: Answer CDR generated. |

TABLE I-continued

| Field Name | Field Size (in bits) | Description |
|---|---|---|
| ANSTYPE | 4 | The type of answer detected for the call.<br>• 0: Nil value<br>• 1: Software answer, no voice detected<br>• 2: Software answer, voice detected<br>• 3: Software answer, audio ringback detected<br>• 4: Hardware answer<br>• 5: Software answer, silence detected<br>• 6: Undefined<br>• 7: Audio Tone Detector (ATD) hardware error or forced disconnect/continuous tone at remote switch.<br>• 8: Software answer, busy tone detected<br>• 9: Software answer, reorder tone detected<br>• 10: IMT software answer<br>• 11: IMT hardware answer<br>• 12–15: Not used. |
| BILLNUM | 96 | Contains a maximum of 24 TBCD digits used to store the billing number for the call. |
| BILLTYPE | 6 | Contains the translation billing type from N00 TCAP queries |
| CAINCT | 3 | CAIN Calltype consists of values onnet and offnet |
| CALLDUR | 32 | Identifies the duration of the call (as four bytes ) in 10 ms ticks. |
| CALLEDNO | 60 | Contains a maximum of 15 TBCD translated called party digits used for the call. |
| CALLTYPE | 16 | Identifies the type of access, service, and number originating the call.<br>ACCESS (5 bits): [0 to 31]<br>SERVICE (6 bits): [0 to 63]<br>NUMBER (5 bits): [0 TO 31] |
| CDRALGOR | 3 | Identifies the method used to select the template to format the CDR record.<br>• 0: Internal CDR format<br>• 1: Template set by CALLTYPE FLEXDIAL use.<br>• 2: Template set through Subscriber Number validation<br>• 3: Template set by TRKGRP/TRKFEAT specification.<br>• 4: Template set by AIN indicator.<br>• 5: Template used is fixed (via office parameter).<br>• 6: Template chosen via best-fit mechanism<br>• 7: Spare |
| CIC | 16 | Contains a maximum of 4 TBCD carrier identification code digits collected for the call. |
| CLDNOA | 7 | Called party number nature of address for CALLEDNO field. |
| CLGNOA | 7 | Calling party number nature of address for the call. |
| CLGPTYNO | 60 | Contains a maximum of 15 TBCD calling party number digits and is used to store the ANI when the ANISP field is used to hold the charge number received (for SS7 FGD and IMT calls). |
| CNPREDIG | 3 | The translated called party prefix digits indicator.<br>• 0: No prefix digits<br>• 1: 0 prefix<br>• 2: 01 prefix<br>• 3: 011 prefix<br>• 4: 1 prefix<br>• 5–7: Spare |
| COLLTIME | 8 | A numeric value identifying when all digits are collected. Recorded as a count of 1-second intervals from origination time. |
| COMPCODE | 4 | Indicates how the call completed.<br>• 0: Normal completed call<br>• 1: Treated call<br>• 2: Abandoned call<br>• 3: Abnormal call<br>• 4: Signaling system error<br>• 5: Forced disconnect invoked<br>• 6: Offnet route advance invoked<br>• 7: Test call<br>• 8–15: Spare |
| COSINDEX | 10 | Identifies the table COSUS index used to perform the class of service screening. Its value ranges from 1 to 1023. |
| COSOVE | 1 | Indicates whether or not class of service screening override has been invoked.<br>• 0: Override not invoked.<br>• 1: Override invoked. |

TABLE I-continued

| Field Name | Field Size (in bits) | Description |
|---|---|---|
| CRID | 36 | PSN Call reference ID. Used to correlate CDR records. |
| DCR | 1 | Identifies if dynamic call routing was used on the call.<br>• 0: Dynamic call routing not invoked.<br>• 1: Dynamic call routing invoked. |
| DIALEDNO | 60 | Contains a maximum of 15 TBCD dialed number digits collected for the call. |
| DIALNOA | 7 | Dialed number nature of address for the DIALEDNO field. |
| DIGDATA | 1 | Identifies if the call is a data call (based on bearer capability value used in the call).<br>• 0: Non-data call<br>• 1: Data call |
| DISCDATE | 9 | The day the call is disconnected (1 to 366). |
| DISCAMPM | 1 | Identifies whether the DISCTIME is for AM(0) or PM(1). |
| DISCTIME | 16 | Contains a 16-bit numeric value indicating the disconnect time as a offset of the number of elapsed seconds since 12:00. |
| DISCTYPE | 2 | Identifies how the call disconnected.<br>• 0: Clear forward<br>• 1: Clear backward<br>• 2: Reoriginated<br>• 3: Switch initiated default value (operator disconnect on operator calls) |
| DNIS | 60 | Contains a maximum of 15 TBCD DNIS digits returned from the SCP. |
| DNISNOA | 7 | The DNIS number nature of address value for the DNIS field. |
| FILLONE | 1 | 1-bit of filler. Used for word packing of the CDR fields in the template. |
| FILLTWO | 2 | 2-bits of filler. Used for word packing of the CDR field in the template. |
| FILLFOUR | 4 | 4-bits of filler. Used for word packing of the CDR fields in the template. |
| FINSID | 10 | The final switch identification of where the call left the CCS7 part of the network. |
| FINTKGRP | 14 | Identifies the final terminating trunk group number of where the call left the CCS7 part of the network. |
| FINTKMEM | 16 | Identifies the final terminating trunk group member number of where the call left the CCS7 part of the network. |
| INCBILL | 2 | Identifies if the CDR record is an incremental CDR associated with long call disconnect capability. |
| INC_INTL | 1 | Indicates if the CLGPTYNO is an international number (1) or not (0). |
| INFODIG | 8 | Contains a maximum of 2 TBCD information digits collected for the call. |
| MLTCOSID | 11 | Identifies the table MULTICOS index used to perform multiple class of service screening. Its value ranges from 1 to 2047. |
| NETOPNO | 60 | Contains a maximum of 15 TBCD digits identifying the digits outpulsed of where the call left the CCS7 part of the network. |
| NETOPNOA | 7 | The network outpulsed number nature of address value for the NETOPNO field. |
| NETSEC | 1 | Identifies if a network security log was generated for the call. |
| NUMADDRS | 2 | Indicates the number of translated numbers available for overflow for the call.<br>• 0: No address returned.<br>• 1: Single address available.<br>• 2: Two address numbers available.<br>• 3: Three address numbers available. |
| NUMWBCKT | 5 | Identifies the number of DS0s on the T1 involved in a wideband call. |
| OPART | 10 | Records the originating partition number used in the call. |
| OPCHOICE | 8 | Identifies the OPCHOICE table index used. |
| ORIGAMPM | 1 | Identifies whether the ORIGTIME is for AM (0) of PM (1). |
| ORIGDATE | 9 | The day the call originates (1 to 366). |
| ORIGECHO | 2 | Identifies the state of the NT6X50EC echo canceller during the call for the originating agent.<br>• 0: NT6X50 Not Installed (default)<br>• 1: Enabled<br>• 2: Switch disabled |

TABLE I-continued

| Field Name | Field Size (in bits) | Description |
| --- | --- | --- |
| | | • 3: Tone disabled |
| ORIGGRP | 14 | Identifies the trunk group number of the originating agent. |
| ORIGLRN | 40 | The ORIGLRN field will hold an originating Location Routing Number (LRN) for calls made from a ported number. |
| ORIGMEM | 14 | Identifies the trunk group member number of the originating agent. |
| ORIGOPRT | 10 | Records the first originating partition number used in the call. |
| ORIGPVN | 60 | The Originating Private Number can contain up to 15 TBCD digits. The Originating Private Number is the customer defined dial plan number assigned to the station or user originating the VPN call. |
| ORIGSTS | 10 | Contains the first serving translation scheme used in the call. |
| ORIGTIME | 16 | Contains a 16-bit numeric value indicating the origination time as an offset of the number of elapsed seconds since 12:00. |
| OSRASSOC | 1 | Identifies if an OSR record is associated with the CDR record. |
| OTPULNOA | 7 | The outpulsed number nature of address value for the OUTPULNO field. |
| OUTPULNO | 60 | Contains a maximum of 15 TBCD digits identifying the called party address number outpulsed for the call. |
| OVERFLOW | 2 | Contains an overflow indicator for the call.<br>• 0: No overflow<br>• 1: S57 RLS w/cause returned, overflow to next available address.<br>• 2: No answer timer expiration, overflow to next available address.<br>• 3: Spare |
| PASSTHRU | 2 | Identifies the passthru action for the call<br>• 0: No passthru<br>• 1: FGD Pure Passthru<br>• 2: FGD Cut-thru Passthru<br>• 3: N00 Passthru |
| PIC | 5 | Indicates the point in call value where the AIN trigger was activated. |
| PINDIGS | 16 | Contains a maximum of 4 TBCD PIN digits collected for the call. |
| PREDIG | 3 | The dialed number prefix digits indicator. See CNPREDIG description. Related to the DIALEDNO field. |
| PRESIND | 2 | Indicates the presentation restriction indicator as applied to the call.<br>• 0: Presentation allowed<br>• 1: Presentation restricted.<br>• 2–3: Spare |
| QUEUED | 1 | Indicates if the call was queued.<br>• 0: Call was not queued<br>• 1: Call was queued |
| RELCAUSE | 8 | Identifies the cause value received in a CCS7 release message. |
| REORGCTR | 4 | Contains a roll-over counter of the number of reorganizations that occurred for the call. |
| RLTCDR | 2 | Indicates whether or not RLT was performed for the call.<br>• 0: No other CDR is associated with the RLT call.<br>• 1: Another CDR is associated with the RLT call.<br>• 2–3: Spare |
| RTELIST | 10 | Identifies the route table number used to route the call. |
| RTENO | 5 | Identifies the route number used in the call. |
| RTETAB | 4 | Identifies the routing table used to specify the route for the call.<br>• 0: Table STDPRTCT<br>• 1: Sub-Table RTEREF (HNPACONT/FNPACONT)<br>• 2: Table CTRTE<br>• 3: Table OFRT<br>• 4: Table OFR2<br>• 5: Table OFR3<br>• 6: Table OFR4<br>• 7: TANDMRTE/TERMRTE<br>• 8–15: Spare |
| SCPBILL | 32 | Used to correlate SCP and DMS-250 switch billing records. |

TABLE I-continued

| Field Name | Field Size (in bits) | Description |
|---|---|---|
| SEQNUM | 16 | Serves as a unique ID for the CDR and also a counter which identifies the number of CDRs generated. |
| STS | 10 | Contains the serving translation scheme used for the call. |
| SUBRIDX1 | 20 | Identifies the numeric index used to validate the subscriber number (SUBRNUM1) in table FLEXVAL. |
| SUBRIDX2 | 20 | Identifies the numeric index used to validate the subscriber number (SUBRNUM2) in table FLEXVAL. |
| SUBRIDX3 | 20 | Identifies the numeric index used to validate the subscriber number (SUBRNUM3) in table FLEXVAL. |
| SUBRIDX4 | 20 | Identifies the numeric index used to validate the subscriber number (SUBRNUM4) in table FLEXVAL. |
| SUBRLOG1 | 1 | Indicates if a log was generated due possible fraudulent use of the subscriber number (SUBRNUM1).<br>• 0: No log generated<br>• 1: Log generated |
| SUBRLOG2 | 1 | Indicates if a log was generated due possible fraudulent use of the subscriber number (SUBRNUM2). |
| SUBRLOG3 | 1 | Indicates if a log was generated due possible fraudulent use of the subscriber number (SUBRNUM3). |
| SUBRLOG4 | 1 | Indicates if a log was generated due possible fraudulent use of the subscriber number (SUBRNUM4). |
| SUBRNUM1 | 64 | Contains a maximum of 16 TBCD digits that are used to store an identified subscriber number. |
| SUBRNUM2 | 64 | Contains a maximum of 16 TBCD digits that are used to store an identified subscriber number. |
| SUBRNUM3 | 64 | Contains a maximum of 16 TBCD digits that are used to store an identified subscriber number. |
| SUBRNUM4 | 64 | Contains a maximum of 16 TBCD digits that are used to store an identified subscriber number. |
| SUBRTYP1 | 10 | Identifies the FLEXTYPE index value for the subscriber number stored in SUBRNUM1. |
| SUBRTYP2 | 10 | Identifies the FLEXTYPE index value for the subscriber number stored in SUBRNUM2. |
| SUBRTYP3 | 10 | Identifies the FLEXTYPE index value for the subscriber number stored in SUBRNUM3. |
| SUBRTYP4 | 10 | Identifies the FLEXTYPE index value for the subscriber number stored in SUBRNUM4. |
| SUBRVAL1 | 2 | Indicates if and how the subscriber number (SUBRNUM1) was validated.<br>• 0: No subscriber number received<br>• 1: Subscriber number received but not validated.<br>• 2: Subscriber number received and validated.<br>• 3: Subscriber number received and validated by default (empty index). |
| SUBRVAL2 | 2 | Indicates if and how the subscriber number (SUBRNUM2) was validated. |
| SUBRVAL3 | 2 | Indicates if and how the subscriber number (SUBRNUM3) was validated. |
| SUBRVAL4 | 2 | Indicates if and how the subscriber number (SUBRNUM4) was validated. |
| TDP | 6 | Identifies the AIN trigger detection point applicable. |
| TERMECHO | 2 | Identifies the state of the NT6X50EC echo canceller during the call for the terminating agent.<br>• 0: NT6X50 Not Installed (default)<br>• 1: Enabled<br>• 2: Switch disabled<br>• 3: Tone disabled |
| TERMGRP | 14 | Identifies the trunk group number of the terminating agent as provisioned in the ADMIN field of table CLL1. |
| TERMLRN | 40 | The TERMLRN field will hold a terminating Location Routing Number (LRN) for the calls made to a ported number. |
| TERMMEM | 14 | Identifies the trunk group member number of the terminating agent as provisioned in table TRKMEM. |
| TERMPVN | 60 | The Terminating Private Number can contain up to 15 TBCD digits. The Terminating Private Number is the customer defined dial plan number assigned to the called party. |

TABLE I-continued

| Field Name | Field Size (in bits) | Description |
|---|---|---|
| TIMECHNG | 1 | Indicates if a clock change occurred during the call.<br>• 0: No time change occurred.<br>• 1: Time change occurred. |
| TPART | 5 | Records the terminating partition number used in the call.. |
| TRAP | 1 | Identifies if a long was generated indicating possible fraudulent use of an authocode number screened through AUTHDCODx.<br>• 0: No authcode trouble log generated.<br>• 1: Authcode trouble log generated. |
| TRIGGER | 5 | Identifies the AIN trigger applied. |
| TRTMTCD | 8 | Identifies the treatment value of a treatment applied to call. |
| UNIVACC | 40 | Contains a maximum of 10 TBCD digits which identify the NPA-NXX-XXXX of the universal access number dialed (UA feature). |
| WBCKTS | 32 | Contained a channel use bit map of the T1 for DSOs used in a wideband call. The channels are read from left to right, 1 through 24. For each bit, the value represents:<br>• 0: Channel not used.<br>• 1: Channel used.<br>The remaining 8 bits of the 32 available bits are reserved for future use. |

The CDRTMPLT table 32 or 44 also includes a CDRTMPLT entry template map which will be more fully described later and a table control (not shown in FIGS. 1a–b) which ensures that 16-bit word boundaries are properly aligned when entering or editing tables.

The CTMPLT C1 directory 33 or 45 are commands, used in conjunction with the CDRTMPLT table 32 or 44, which provide an additional level of control over the table and the templates used by call processing. A directory is used so that an operator may enter the TABLE directory by executing TABLE CDRTMPLT and then enter the CTMPLT directory by executing CTMPLT at the prompt. Among others, the CTMPLT C1 directory 33 or 45 includes an UPGRADE command which enables templates that have been edited to become active for formatting CDR records and a RESTORE comand to return to the prior version of a template. The RESTORE command also includes a HISTORY option which allows the operator to view the seven previous versions of the template. Finally, the CTMPLT C1 directory 33 or 45 also maintains a CDR field type attribute map to be more fully described later.

Figure 2:
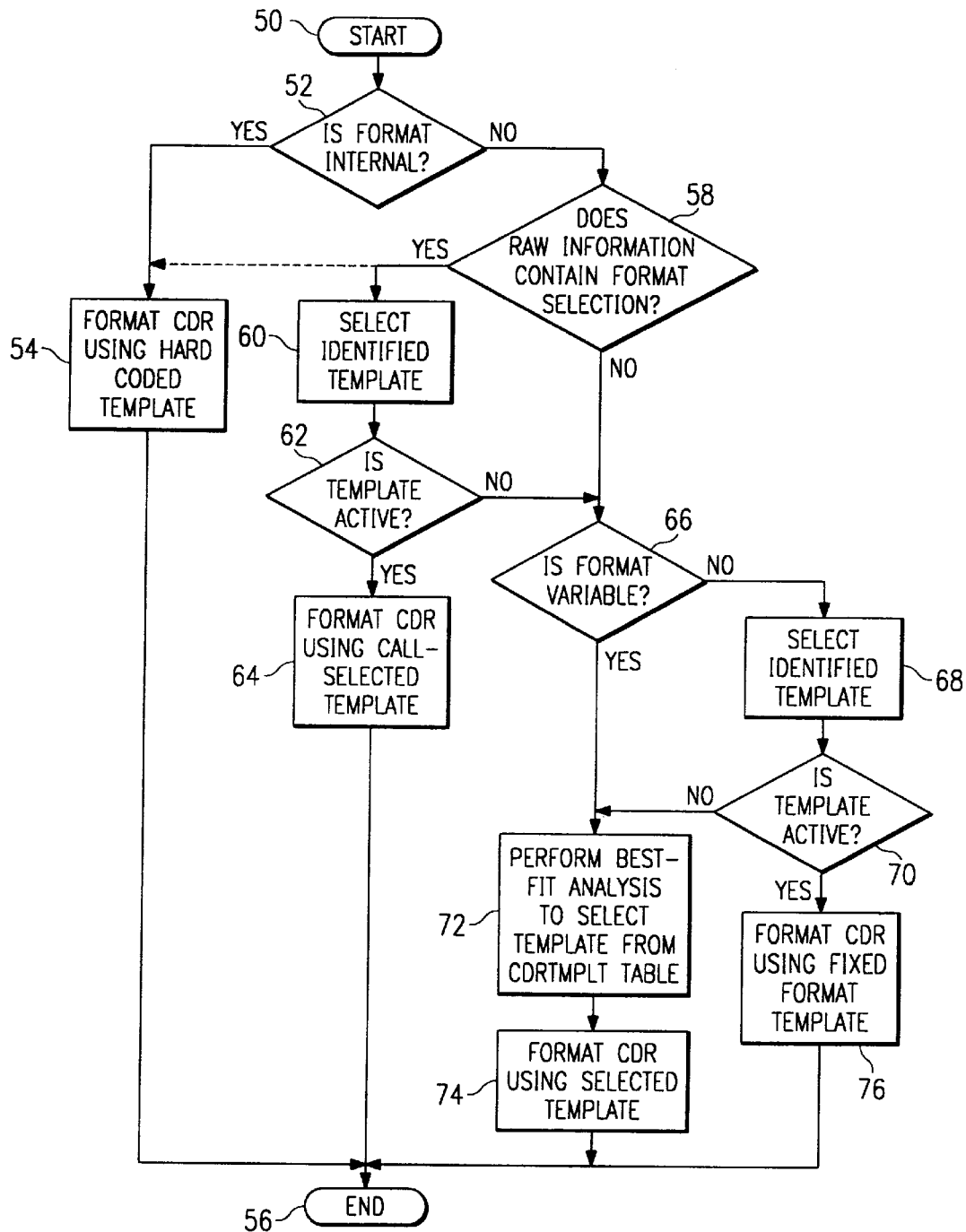
FIG. 2 is a flow chart of a method for flexible formatting of CDR records.

Referring next to FIG. 2, a method of formatting raw call information stored in the RU 26 such that the raw call information may be formatted into a data structure selected, based upon characteristics thereof, as optimal for the raw call information contained in the RU 26 will now be described in greater detail. The method commences at step 50 upon completion of the call for which the raw call information contained in the RU 26 had been collected and transfer of the raw call information to the formatter 28 or 38. Proceeding to step 52, the formatter 28 determines if the FCDR_CDR_TMPLT parameter of the office parameters 31 or 41 is set to INTERNAL. If so, the method proceeds to step 54 where the RU 26 is formatted using a conventional hard coded superset template characterized by including fields for all data types potentially collected by the RU 26. Having formatted the RU 26 in accordance with the known superset template, the method ends at step 56.

If, however, the FCDR_CDR_TMPLT parameter is not set to INTERNAL, the method proceeds to step 58 where the formatter 28 or 38 examines the raw call information contained in the RU 26 or 26' to determine if a template was selected during the call itself. More specifically, a template to be used when formatting the raw information collected during a call may be identified by the collected information itself. For example, in certain systems, a subscriber number, call type indicator or trunk group indicator collected by the call condense agent 22 will contain a template selection for use when formatting the collected call information. While, in most cases, the raw information will contain a template selection from the CDRTMPLT table 32 or 44, on occasion, the raw information will contain a selection of a hard coded template. If so, the method will proceed to step 54 (following the path shown in phantom in FIG. 2) for formatting of the RU 26 or 26' into a CDR using the hard coded template. Should the raw call information contains a format selection, the method proceeds from step 58 to step 60 where the identified template is selected from the CDRTMPLT table 32 or 44 and, continuing on to step 62, the second field of the identified template is examined to determine if the template has been activated. If the selected template has been activated, the method proceeds to step 64 where the RU 26 or 26' is formatted into a CDR structured in accordance with the selected template and on to step 56 where the method ends.

Should it be determined at step 58 that the raw call information contained in the RU 26 or 26' not contain a format selection or should it be determined at step 62 that the selected template is not active, the method proceeds to step 66 where the office parameters 31 or 41 are again examined to determine if the format is set to FIXED or VARIABLE. If the format is set to FIXED, the method proceeds to step 68 where the third field of the FCDR_CDR_TMPLT office parameter is examined to determine a template to be selected from the CDRTMPLT table 32 or 44 for formatting of the RUs 26 or 26' as CDRs. Continuing on to step 70, the second field of the template selected from the CDRTMPLT table 32 or 44 is examined to determine if the template has been activated. If the selected template has been activated, the method proceeds on to step 76 where the RUs 26 or 26' are formatted as CDRs in accordance with the data structure defined by the selected template and then to step 56 where the method ends.

If, however, the examination of the office parameters 31 or 41 at step 66 indicates that the format is set to VARIABLE or if it is determined at step 70 that the template selected from the CDRTMPLT table 32 or 44 is inactive, the method proceeds to step 72 where each template contained in the CDRTMPLT table 32 or 44 is examined and a "best-fit" template which optimally fits the RU 26 or 26' is selected. After selecting a template at step 72, the method proceeds to step 74 where the RUs 26 or 26' are formatted as CDRs in accordance with the data structure defined by the selected template and on to step 56 where the method ends.

Figure 3:
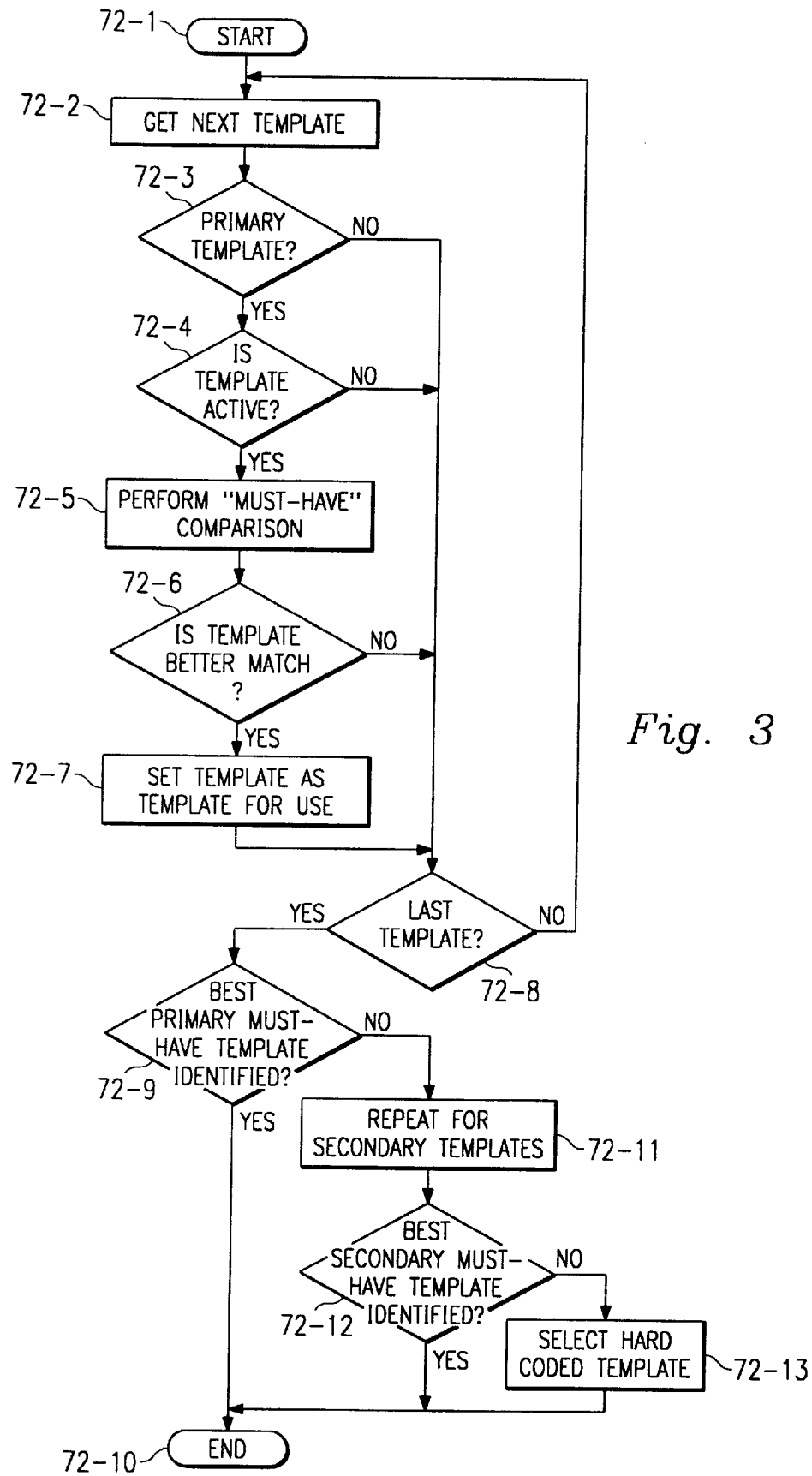
FIG. 3 is a flow chart of a "must-have" comparison technique which forms part of the method for flexible formatting of CDR records of FIG. 2.

Referring next to FIG. 3, the analysis of the RU 26 or 26' performed by the formatter 28 or 38 to determine an optimal or "best fit" template to be used when formatting the RU 26 or 26' into a data structure shall now be described in greater detail. The method commences at step 72-1 and, at step 72-2, a first template (if no templates have yet to be examined) or a next template (if one or more templates have already been examined) is retrieved from the CDRTMPLT table 32 or 44. At step 72-3, the second field of the next entry of the CDRTMPLT table 32 or 44 is examined to determine if the entry relates to a primary or secondary template. If the template has been classified as a primary template, the method proceeds to step 72-4 where the first field of the template is examined to determine if the template is active. Otherwise, the method proceeds to step 72-8 for a determination as to whether all of the templates of the CDRTMPLT table 32 or 44 have been examined.

Returning to step 72-4, If the template has been activated, the method then proceeds to step 72-5 where suitability of the template for use when formatting the RU 26 or 26' as a CDR is determined. If the template is not activated, the method again proceeds to step 72-8 for a determination as to whether all of the templates of the CDRTMPLT table 32 or 44 have been examined.

Returning to step 72-5, suitability of the template is determined by execution of a "must-have" comparison for the template. More specifically, as call detail information is collected for storage in the RU 26 or 26', a capture map for the RU 26 or 26' is produced. The capture map is comprised of a plurality of 1-bit fields, each of which are associated with a type of call detail which may be captured by the call condense agent 22 or 22' for incorporation into the RU 26 or 26'. For each type of call detail which is captured, the corresponding 1-bit field for the capture map is set high. If, however, the RU 26 or 26' never receives data for that field type, the corresponding field of the capture map will remain low. As previously discussed, all CDR field types include an attribute which is either set to "don't care" or "must-have". When "best fit" analysis is performed to select a CDR template, this attribute identifies whether or not the template can be considered or discarded due to the capturing of information in the particular field. For example, if the attribute for the ACCTV field is set to "don't care" and the field is captured by call processing, then a template without the ACCTV field can be considered for formatting. If the attribute is set to "must-have", then a template without the ACCTV field cannot be considered for formatting. When more than one template is acceptable, the "best fit" template will be that (1) all of the "must-have" call details which were captured by the raw call information, (2) the greatest number of "don't care" call details which were captured by the raw call information and (3) the least number of call detail types which were not captured by the raw call information.

Selection of a "best-fit" template may be best described by way of example. While Table I, above, lists 114 different types of fields which may be included in a template, for ease of description, the provided example assumes that only ten field types, arbitrarily named fields A through J, respectively, may be included in the template. Each field type correspond to a type of raw information which is potentially collectable by the call condense agent 22 for placement in the RU 26 or 26', the capture map for the RU 26 or 26' includes a separate bit for each type of captureable information. A sample capture map for the RU 26 is set forth in Table II, below.

TABLE II

| A | B | C | D | E | F | G | H | I | J |
|---|---|---|---|---|---|---|---|---|---|
| 1 | 1 | 0 | 0 | 0 | 1 | 1 | 1 | 1 | 1 |

This sample capture map for the RU 26 indicates that raw information has been collected for information types A, B, F, G, H, I, and J.

As previously stated, the CDRTMPLT table 32 or 44 is comprised of a series of template entries, each of which includes first, second and third fields. The CDRTMPLT table 32 or 44 also includes the CDRTMPLT entry template map while the CTMPLT C1 directory 33 or 45 maintains a CDR field type attribute map. The CDRTMPLT entry template map identifies, for one of the templates included in the CDRTMPLT table 32 or 44, which of the field types are included in each of the templates. The CDR field type attribute map, on the other hand, indicates, for each of the field types, whether captured data of that type must be in the formatted CDR. In other words, the CDR field type attribute map contains the "must-have/don't care" field type attribute for each field type. Sample CDRTMPLT entry template map and CDR field type attribute maps for a first template, hereafter referred to as Template 1, respectively included in the CDRTMPLT table 32 or 44 and the CTMPLT C1 directory 33 or 45 is set forth in Table III, below.

TABLE III

| A | B | C | D | E | F | G | H | I | J |
|---|---|---|---|---|---|---|---|---|---|
| 1 | 1 | 1 | 1 | 0 | 1 | 1 | 1 | 1 | 1 |
| 1 | 0 | 1 | 1 | 0 | 0 | 1 | 1 | 1 | 1 |

By adding the capture map set forth in Table II to the CDR field type attribute map set forth in the first row of Table III, it may be determined that the RU 26 or 26' has captured 5 "must-have's." By adding the capture map set forth in Table II to the inversion of the CDR field type attribute set forth in the second row of Table III, it may be further determined that the RU 26 or 26' has captured 2 "don't care's." Finally, by examining the CDRTMPLT entry template set forth in Table III, it may be still further determined that Template 1 includes one empty field.

After completing the "must-have" comparison for Template 1, the method proceeds to step 72-6. There the examined criteria for Template 1 are compared to the criteria for the template presently designated as the "best fit" template. If Template 1 is the first primary template examined or if no template has been designated as the "best fit" template and Template 1 contains all of the captured "must-have" fields, Template 1 is designated as the best matching template. If Template 1 is the first primary template examined or if no primary template has been designated as the "best fit" template and Template 1 does not contain all of the captured "must-have" fields, Template 1 is determined to not be the "best fit" template and the method returns to step 72-6. If there is an existing template designated as the "best fit"

template, Template 1 and the "best fit" template are compared to determine which of the two contain: (1) all of the captured "must have" fields, (2) the most number of captured "don't care" fields and (3) the least amount of store for empty fields, The template which best meets these criteria would then be determined to be the "best fit" template.

The method then proceeds to step 72-7 where the template determined to be the "best fit" template is set as the template for use and on to step 72-8 where a determination is made if all of the primary templates in the CDRTMPLT table 32 or 44 have been examined. If there are additional primary templates to be examined, the method returns to step 72-2 where the next template is selected for examination.

Returning to step 72-8, if the last template included in the CDRTMPLT table 32 or 44 has been examined, the method proceeds to step 72-9 where it is determined if one of the primary templates has been identified has the "best fit" template and set as the template for use. If one of the primary templates has been so identified, the method ends at step 72-10. If, however, no primary template has been so identified, (a result that will occur if (1) there are no primary templates, (2) there are no active primary templates, or (3) ther are no active primary templates that contain all of the captured "must-have" fields), the method proceeds to step 72-10 where the above described process is repeated for the secondary templates included in the CDRTMPLT table 32 or 44. After all of the secondary templates contained in the CDRTMPLT table 32 or 44 have been examined in the above-described manner, the method proceeds to step 72-12 where a determination is made as to whether one of the secondary templates has been identified as the "best fit" template and been set as the template for use. Again, the criteria for selecting one of the secondary templates as the "best fit" template is the same as that utilized in conjunction with the primary templates. If one of the secondary templates has been identified as the "best fit" template and selected for use, the method ends at step 72-10. If, however, none of the secondary templates have been selected as the "best fit" template, the method proceeds to step 72-13 where the hard coded template is selected and, having selected the hard coded template as the template for use, the method ends at step 72-10.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A switch for a telecommunications network, said switch comprising:
   a call condense agent, said call condense agent collecting raw call information for calls handled by said switch, said raw call information for a first one of said calls containing data for at least one of a plurality of data types;
   a formatting agent;
   a storage facility coupled to said formatting agent, said storage facility maintaining a plurality of data structures, each one of said plurality of data structures containing a respective subset of said plurality of data types;
   said formatting agent selecting, based upon an examination of (1) said raw call information for said first one of said calls, (2) said plurality of data structures and (3) a call detail type attribute map which describes an attribute of each one of said plurality of data types, an optimal one of said plurality of data structures for formatting said raw call information for said first one of said calls and producing a call detail record by formatting said raw call information for said first one of said calls in accordance with said optimal data structure;
   for each one of said plurality of CDR templates, said formatter comparing said raw call information for said first one of said calls to said call detail type attribute map and said CDR template and, based on said comparison, for each one of said plurality of data structures, of said raw call information for said first one of said calls to said call detail type attribute map and said CDR template, selecting one of said plurality of data structures as said optimal data structure for said first one of said calls.

2. The switch of claim 1 wherein:
   said storage facility is also coupled to said call condense agent, said storage facility including a first portion where said raw call information for said first one of said calls is maintained.

3. The switch of claim 1 wherein:
   said storage facility is also coupled to said call condense agent, said storage facility including a first portion where said raw call information for said first one of said calls is maintained, a second portion where said plurality of data structures are maintained and a third portion where said call detail record for said first one of said calls is maintained.

4. The switch of claim 1 wherein:
   said storage facility is also coupled to said call condense agent, said storage facility including a first portion where said raw call information for said first one of said calls is maintained and a second portion where said plurality of data structures are maintained.

5. A telecommunications network, comprising:
   an IXC switch for handling calls, said IXC switch including a first agent for collecting raw information for said calls handled by said IXC switch, said raw information for a first one of said calls containing data for at least one of a plurality of data types; and
   a billing server, coupled to said IXC switch;
   a storage facility coupled to said billing server, said storage facility maintaining a plurality of data structures and a call detail type attribute map, each one of said plurality of data structures containing a respective subset of said plurality of data types and said call detail type attribute map describing an attribute of each one of said types of call details;
   said billing server including a second agent for formatting said raw information collected by said first agent for said first one of said calls into a selected one of said plurality of data structures, said selected one of said plurality of data structures selected by said second agent based upon an examination, for each one of said plurality of CDR templates, of (1) said raw information for said first one of said calls, (2) said call detail type attribute map and (3) said plurality of data structures;
   said second agent comparing, for each one of said plurality of data structures, said raw call information for said first one of said calls to said call detail type attribute map and said CDR template and, based on said comparison, for each one of said plurality of data structures, of said raw call information to said call detail type attribute map and said CDR template, selecting one of said plurality of data structures for formatting said raw information for said first one of said calls.

6. A method of selectively formatting call detail information acquired during a call, comprising the steps of:

providing a plurality of call detail record (CDR) templates, each defining a respective data structure and comprised of a selected subset of a set of types of call details;

providing a call detail type attribute map, said call detail type attribute map describing an attribute of each one of said types of call details;

examining call detail information acquired during a call;

examining each one of said plurality of CDR templates;

selecting, from said plurality of CDR templates, a CDR template based upon said examination of (1) said call detail information acquired during said call, (2) said plurality of CDR templates and (3) said call detail type attribute map; and formatting said call detail information acquired during said call in accordance with said data structure defined by said selected CDR template;

wherein the step of selecting, from said plurality of CDR templates, a CDR template based upon said examination of (1) said call detail information acquired during said call, (2) said plurality of CDR templates and (3) said call detail type attribute map further comprises the steps of:

for each one of said plurality of CDR templates, comparing said call detail information for said call to said call detail type attribute map and to said CDR template; and based upon said comparison, for each one of said plurality of CDR templates, of said call detail information for said call to said call detail type attribute map and said CDR template, selecting one of said plurality of CDR templates for use in formatting said call detail information for said call.

7. The method of claim 6 wherein the step of selecting one of said plurality of CDR templates for use in formatting said call detail information for said call based upon said comparison, for each one of said plurality of CDR templates, of said call detail information for said call to said call detail attribute map and said CDR template further comprises the step of:

selecting, based upon said comparison, for each one of said plurality of CDR templates, of said call detail information for said call to said call detail type attribute map and said CDR template, said CDR template which best fits said call detail information for said call.

8. The method of claim 6 wherein said call detail information for said call is comprised of a plurality of call details, each of a different type, and each one of said plurality of CDR templates defines a plurality of call detail types and wherein the step of comparing each of said plurality of CDR templates to said call detail information for said call further comprises the step of:

classifying each one of said call detail types which may be included in a CDR template as either a "must-have" call detail or a "don't care" call detail;

selecting said CDR template which includes:

(1) all of said must-have call details captured by said raw call information for said call;

(2) the greatest number of said "don't care" call details captured by said raw call information for said call; and (3) the least amount of store for call detail types which were not captured by said raw call information for said call.

9. A method of selectively formatting call detail information acquired during a call, comprising the steps of:

providing a first CDR template which contains all of said types of call details;

providing a table comprised of a plurality of CDR templates, each comprised of a selected subset of said types of call details;

providing a call detail type attribute map, said call detail type attribute map describing an attribute of each one of said types of call details;

determining whether to format said call detail information using said first CDR template or one of said plurality of CDR templates included in said table;

if said first CDR template is selected, formatting said call detail information in accordance with a full-set data structure defined by said first CDR template;

if said CDR template table is selected, examining said call detail information acquired during a call, said plurality of CDR templates and said call detail type attribute map, selecting a CDR template based upon said examination of said call detail information acquired during said call, said plurality of CDR templates and said call detail attribute map and formatting said call detail information in accordance with a subset data structure defined by said selected CDR template;

wherein the step of selecting, from said plurality of CDR templates, a CDR template based upon said examination of said call detail information acquired during said call, said plurality of CDR templates and said call detail type attribute map further comprises the steps of:

for each one of said plurality of CDR templates, comparing said call detail information for said call to said call detail map and to said CDR template; and based upon said comparison, for each one of said plurality of CDR templates, of said call detail information for said call to said call detail attribute map and said CDR template, selecting one of said plurality of CDR templates for use in formatting said call detail information for said call.

10. The method of claim 9 wherein the step of selecting one of said plurality of CDR templates for use in formatting said call detail information for said call based upon said comparison, for each one of said plurality of CDR templates, of said call detail information for said call to said call detail type attribute map and said CDR template further comprises the step of:

selecting, based upon said comparison, for each one of said plurality of CDR templates, of said call detail information for said call to said call detail type attribute map and said CDR template, said CDR template which best fits said call detail information for said call.

11. The method of claim 10 wherein said call detail information is comprised of a plurality of call details, each of a different type, and each one of said plurality of CDR templates defines a plurality of call detail types and wherein the step of comparing each of said plurality of CDR templates to said call detail information further comprises the step of:

classifying each one of said call detail types which may be included in a CDR template as either a "must-have" call detail or a "don't care" call detail;

selecting said CDR template which includes:

(1) all of said must-have call details captured by said raw call information;

(2) the greatest number of said "don't care" call details captured by said raw call information; and (3) the least amount of store for call detail types which were not captured by said raw call information.

12. A method of selectively formatting call detail information acquired during a call, comprising the steps of:

providing a first CDR template which contains all types of call details potentially acquired during said call;

providing a table comprised of a plurality of CDR templates, each comprised of a selected subset of said types of call details;

providing a call detail type attribute map, said call detail type attribute map describing an attribute of each one of said types of call details;

determining whether to format said call detail information using said first CDR template;

if said first CDR template is selected, formatting said call detail information in accordance with a full-set data structure defined by said first CDR template;

if said first CDR template is not selected, examining call detail information acquired during said call to determine whether said first CDR template or one of said plurality of CDR templates included in said CDR template table is to be selected;

if one of said plurality of CDR templates are to be selected, determining if one of said plurality of CDR templates has been pre-selected;

if one of said plurality of CDR templates has been pre-selected, formatting said call detail information acquired during said call in accordance with said pre-selected CDR templates;

if one of said plurality of CDR templates has not been pre-selected, examining each one of said plurality of CDR templates contained in said table, selecting a CDR template based upon said examination of said call detail information acquired during said call, said examination of each one of said plurality of CDR templates contained in said table and said call detail type attribute map, and formatting said call detail information in accordance with a subset data structure defined by said selected CDR template;

wherein the step of selecting, from said plurality of CDR templates, a CDR template based upon said examination of said call detail information acquired during said call, said plurality of CDR templates and said call detail type attribute map further comprises the steps of:

for each one of said plurality of CDR templates, comparing said call detail information for said call to said call detail type attribute map and to said CDR template; and based upon said comparison, for each one of said plurality of CDR templates, of said call detail information for said call to said call detail type attribute map and said CDR template, selecting one of said plurality of CDR templates for use in formatting said call detail information for said call.

13. The method of claim 12 wherein the step of selecting one of said plurality of CDR templates for use in formatting said call detail information for said call based upon said comparison, for each one of said plurality of CDR templates, of said call detail information for said call to said call detail type attribute map and said CDR template further comprises the step of:

selecting, based upon said comparison, for each one of said plurality of CDR templates, of said call detail information for said call to said call detail type attribute map and said CDR template, said CDR template which best fits said call detail information for said call.

14. The method of claim 13 wherein said call detail information acquired during said call is comprised of a plurality of call details, each of a different type, and each one of said plurality of CDR templates defines a plurality of call detail types and wherein the step of selecting one of said plurality of CDR templates based upon said comparison of each of said plurality of CDR templates to said call detail information acquired during said call further comprises the step of:

classifying each one of said call detail types which may be included in a CDR template as either a "must-have" call detail or a "don't care" call detail;

selecting said CDR template which includes:
(1) all of said must-have call details included in said call detail information acquired during said call;
(2) the greatest number of said "don't care" call details included in said call detail information acquired during said call; and
(3) the least amount of store for call detail types which were not included in said call detail information acquired during said call.

15. The method of claim 14 and further comprising the step of:

generating a capture map which describes said call detail information acquired during said call;

wherein said provided call detail type attribute map describes whether each one of said call detail types is a "must-have" call detail or a "don't care" call detail; and adding said capture map and said call detail type attribute map to determine the number of "must-have" and "don't care" call details included in said call detail information acquired during said call.

* * * * *